(12) United States Patent
Polidori

(10) Patent No.: US 10,465,732 B2
(45) Date of Patent: Nov. 5, 2019

(54) CAPTIVE SHEAR BOLT

(71) Applicant: Connector Products Inc., Pennsauken, NJ (US)

(72) Inventor: Nicholas Polidori, Medford, NJ (US)

(73) Assignee: Connector Products Inc., Pennsauken, NJ (US)

( * ) Notice: Subject to any disclaimer, the term of this patent is extended or adjusted under 35 U.S.C. 154(b) by 0 days.

(21) Appl. No.: 15/890,660

(22) Filed: Feb. 7, 2018

(65) Prior Publication Data

US 2018/0258975 A1    Sep. 13, 2018

Related U.S. Application Data

(60) Provisional application No. 62/468,564, filed on Mar. 8, 2017, provisional application No. 62/529,228, filed on Jul. 6, 2017.

(51) Int. Cl.
| | |
|---|---|
| *H01R 4/30* | (2006.01) |
| *F16B 31/02* | (2006.01) |
| *H01R 4/42* | (2006.01) |
| *F16B 37/14* | (2006.01) |
| *F16B 1/00* | (2006.01) |

(52) U.S. Cl.
CPC ........... *F16B 31/021* (2013.01); *F16B 37/14* (2013.01); *H01R 4/42* (2013.01); *F16B 2001/0064* (2013.01)

(58) Field of Classification Search
CPC ......... H01R 4/5083; H01R 4/42; H01R 4/34; H01R 33/22; H01R 11/15; F16B 31/02; F16B 31/021; F16B 21/06; F16B 21/086; F16B 19/06

USPC ........ 439/783, 792, 801–803; 411/1–5, 338, 411/339, 500, 501, 506, 509
See application file for complete search history.

(56) References Cited

U.S. PATENT DOCUMENTS

| | | | | |
|---|---|---|---|---|
| 3,512,447 A | * | 5/1970 | Vaughn ................ | F16B 31/021 411/5 |
| 3,742,583 A | * | 7/1973 | Devlin ................ | F16B 31/021 29/413 |
| 3,978,761 A | * | 9/1976 | Sosinski .............. | F16B 31/021 411/5 |
| 4,627,774 A | * | 12/1986 | Bradley .............. | F16B 31/021 411/410 |
| 4,729,703 A | * | 3/1988 | Sato .................... | F16B 31/021 411/237 |
| 4,768,895 A | * | 9/1988 | Ludwig .............. | F16C 11/0614 188/321.11 |
| 5,064,326 A | * | 11/1991 | Davis .................. | F16B 41/005 292/327 |

(Continued)

*Primary Examiner* — Thanh Tam T Le
(74) *Attorney, Agent, or Firm* — Condo Roccia Koptiw LLP

(57) ABSTRACT

A captive shear bolt assembly includes a bolt and a shear coupling. The bolt may have a head, an extension, and a shank. The shear coupling may be configured to be received by the extension. The shear coupling may be configured to receive the extension via an orifice in the shear coupling. The shear coupling may be configured to shear when an upper head of the shear coupling is driven at a threshold torque. When the shear coupling has sheared, the extension may be configured to captively secure the upper head to the bolt. The captive shear bolt assembly may be used in a tap connector for electrically connecting a main conductor to a tap conductor.

7 Claims, 16 Drawing Sheets

(56) References Cited

U.S. PATENT DOCUMENTS

| | | | | | |
|---|---|---|---|---|---|
| 5,092,797 | A | * | 3/1992 | Cole | H01R 4/5091 411/2 |
| 5,228,250 | A | * | 7/1993 | Kesselman | F16B 31/021 411/373 |
| 5,419,667 | A | * | 5/1995 | Avgoustis | B21K 1/56 411/386 |
| 5,713,705 | A | * | 2/1998 | Grunbichler | F16B 31/021 411/410 |
| 5,772,252 | A | * | 6/1998 | Malani | F16B 31/021 285/337 |
| 6,071,051 | A | * | 6/2000 | Reed | B23P 6/04 411/386 |
| 6,176,659 | B1 | * | 1/2001 | Hardt | F16B 31/021 411/393 |
| 6,224,596 | B1 | * | 5/2001 | Jackson | A61B 17/7032 411/5 |
| 6,739,631 | B2 | * | 5/2004 | Smith | F16L 21/08 285/337 |
| 7,179,034 | B2 | * | 2/2007 | Ladouceur | B23P 19/062 29/432.1 |
| 8,262,331 | B2 | * | 9/2012 | Toosky | F16B 33/004 411/361 |
| 8,267,630 | B2 | * | 9/2012 | Moon | F16B 5/02 411/110 |
| 8,317,443 | B2 | * | 11/2012 | Stauch | H01R 4/363 411/2 |
| 8,641,344 | B1 | * | 2/2014 | Avetisian | F16B 39/32 411/321 |
| 8,668,419 | B2 | * | 3/2014 | Hardt | H01R 4/307 411/2 |
| 8,696,274 | B2 | * | 4/2014 | Kim | F16B 31/00 411/2 |

\* cited by examiner

CAPTIVE SHEAR BOLT

CROSS-REFERENCE TO RELATED APPLICATIONS

This application claims priority to U.S. provisional patent application No. 62/468,564, filed Mar. 8, 2017, and U.S. provisional patent application No. 62/529,228, filed Jul. 6, 2017, which are incorporated herein by reference in their entirety.

BACKGROUND

Shear bolts are well known. A typical shear bolt may be configured to shear under a threshold torque. For example, a typical shear bolt may include a shear section that is configured to shear when a threshold torque is applied at a head of the shear bolt. The shear section may be located at a shoulder, a head, and/or the threads of the typical shear bolt. When a typical shear bolt shears, the sheared portion of the bolt is separated from the securing portion of the shear bolt. The separated portion (e.g., sheared portion) may fall to the ground below.

Electrical connector assemblies are well known. An electrical connector assembly may be adapted to electrically and mechanically connect conductors within a transmission or distribution circuit. For example, a typical electrical connector assembly may be used to connect a main conductor to a tap or run conductor. An electrical connector assembly adapted to connect a transmission conductor or a tap conductor to another conductor may be referred to as a tap connector. A tap connector may include a C-shaped body having a curved top wall adapted to fit over a main conductor (e.g., such as a transmission conductor). A bolt-operated wedge may be carried by the bottom of the C-shaped body and may include an elongated recess in the top for supporting the tap conductor (e.g., such as a distribution conductor). A bolt may be operated to positively move the wedge both in and out so that the clamping action of the connector can be tightened or loosened as desired.

The use of shear bolts in tap connectors is well known. For example, a shear bolt may be used to tighten the clamping action of the connector such that a tap conductor is captively engaged within the tap connector. However, it would be desirable if there were available shear bolts that could prevent the sheared section of the shear bolt from falling to the ground below.

SUMMARY

As described herein, a captive shear bolt assembly may include a bolt and a shear coupling. The bolt may have a head, an extension extending from a top surface of the head, and a shank extending from a bottom surface of the head. The bolt may include a first cavity and a second cavity, for example, through an axis of rotation of the bolt. The first cavity may extend partially into the extension. The second cavity may extend partially into the shank (e.g., the non-threaded portion and/or the threaded portion). The shank may be partially threaded. For example, the shank may include a shoulder, a threaded portion, and a non-threaded portion. The shoulder may extend from the bottom surface of the head to the threaded portion. The shoulder may not have any threads. The non-threaded portion may be between the threaded portion and a distal end of the shank. The non-threaded portion may have a first diameter that is less than a second diameter of the shoulder. The first diameter may be less than or equal to a minor diameter of the threads of the threaded portion. The shank may be configured to receive a lock washer or a retaining ring. The retaining ring may be installed radially or axially onto the shank.

The shear coupling may include an upper head, a lower head, and a shear section. The shear coupling may define an orifice therethrough. The shear coupling (e.g., via the orifice) may be configured to receive the extension and the head of the bolt. An upper portion of the extension may be configured to be deformed (e.g., partially deformed) by inserting a tool within the first cavity. The deformed upper portion may be configured to prevent removal of the shear coupling from the bolt (e.g., the extension). The deformed upper portion of the extension may be configured to engage an upper inner surface of the upper head such that the upper head is captively secured to the bolt.

The shear section may be configured to shear when the upper head is driven at a pre-determined (e.g., threshold) torque. The shear section may be located between the upper head and the lower head. The shear section may define a tapered cross section with a first diameter at a lower surface of the upper head, a second diameter at an upper surface of the lower head, and a third diameter at a midpoint between the upper surface and the lower surface. The first diameter and the second diameter may be greater than the third diameter. The third diameter may be configured such that the shear section shears at the pre-determined torque. When the shear section has sheared, the extension may be configured to captively secure the shear coupling (e.g., the upper head) to the bolt.

As described herein, an electrical connector may be configured to electrically connect a main conductor (e.g., such as a transmission conductor) to a tap conductor (e.g., such as a distribution conductor). The electrical connector may be referred to as a tap connector. The tap connector may include a captive shear bolt assembly. The tap connector may include a body member, for example, a substantially C-shaped body member. The body member may have a curved top wall configured to receive a main conductor. The tap connector may include a wedge configured to be received by the body member. The wedge may be configured to receive a distribution connector. The tap connector may include a conductor interface insert. The conductor interface insert may define an upper surface configured to engage the main conductor and may define a lower surface configured to engage the distribution connector. The conductor interface insert may be configured to electrically connect the main conductor and the tap conductor.

The tap connector may include one or more lock washers or retaining rings for retaining the captive shear bolt within the wedge and/or body member. The wedge may include a tab with an aperture. The aperture may be configured to receive the shank of the captive shear bolt. The wedge may include a slide with an orifice. The orifice may be configured to receive the shank of the captive shear bolt. The captive shear bolt may be configured to shear when the wedge is in a position such that the main conductor and the tap conductor are electrically connected.

DETAILED DESCRIPTION

Figure 1A:
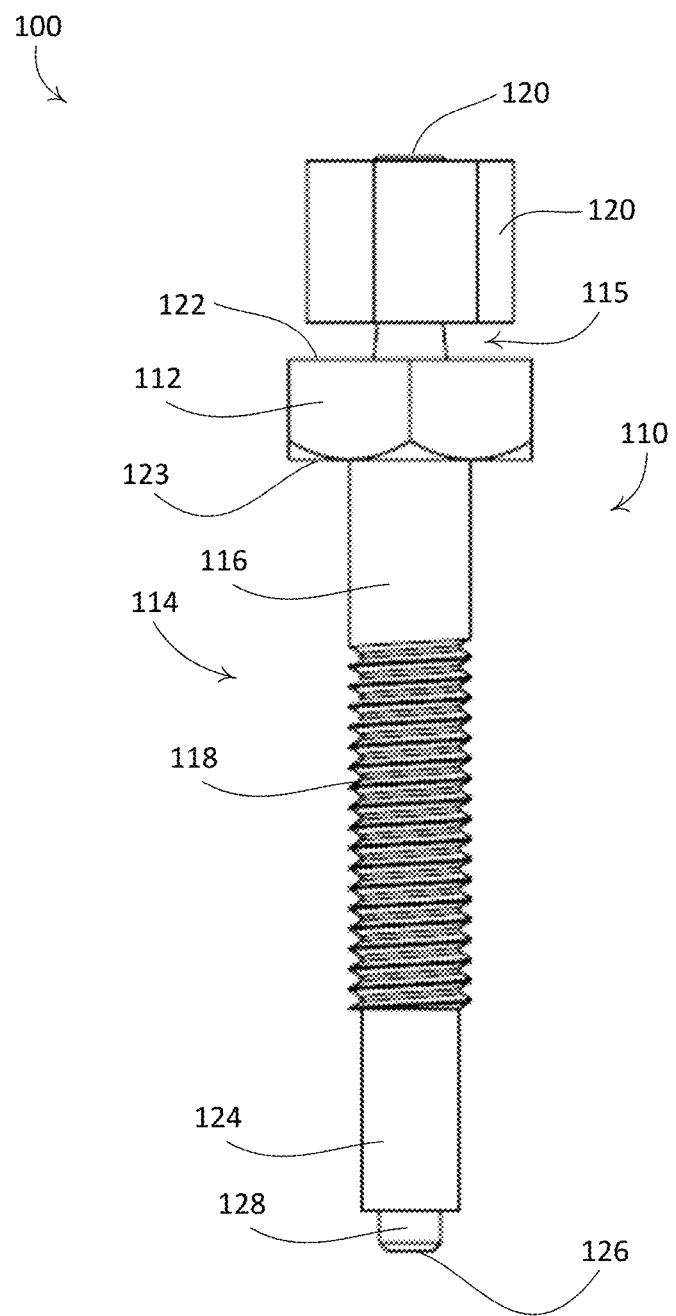
FIG. 1A is an example captive shear bolt assembly.
Figure 1B:
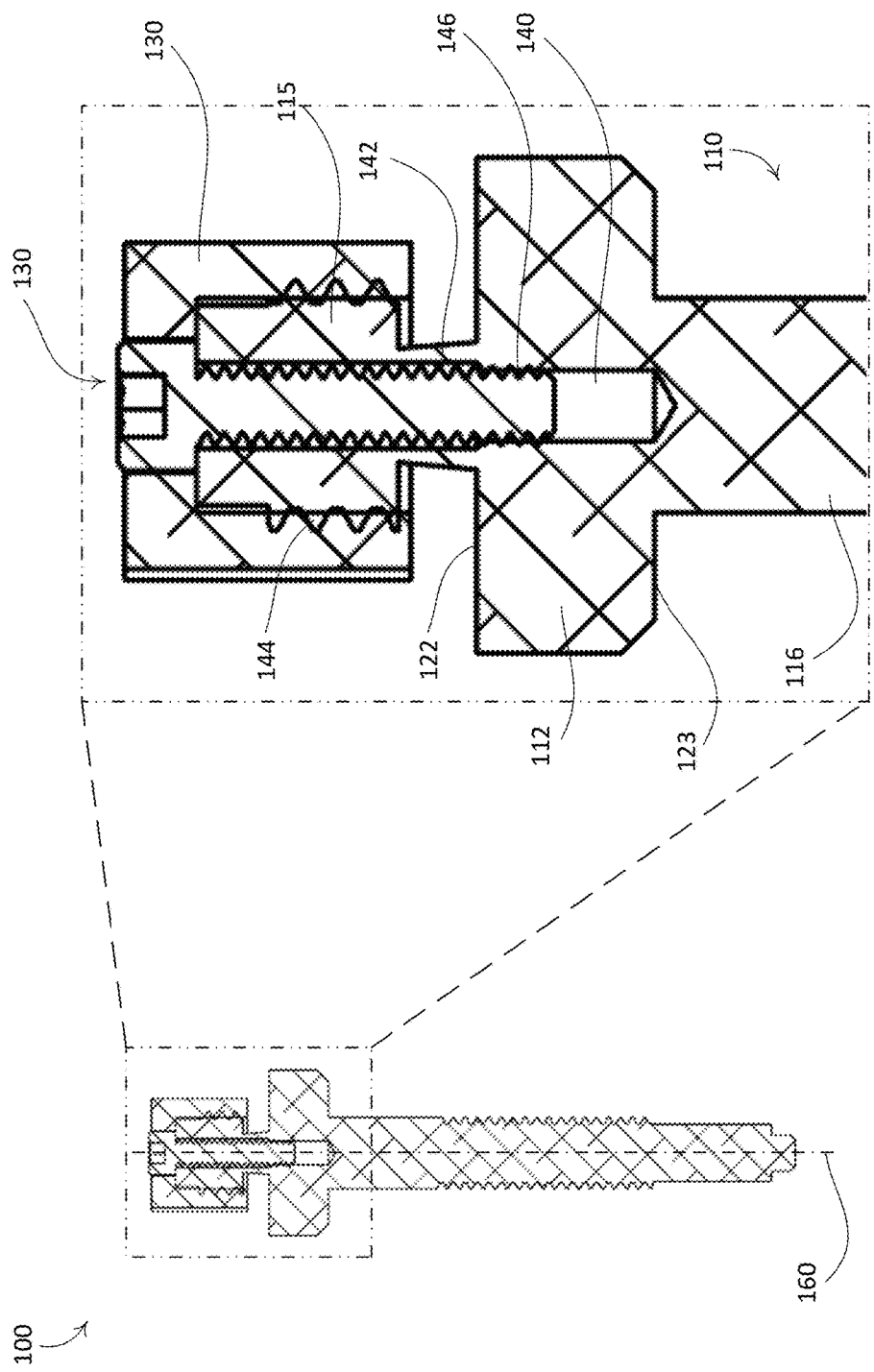
FIG. 1B is a cross-section view of the example captive shear bolt assembly shown in FIG. 1A.
Figure 1C:
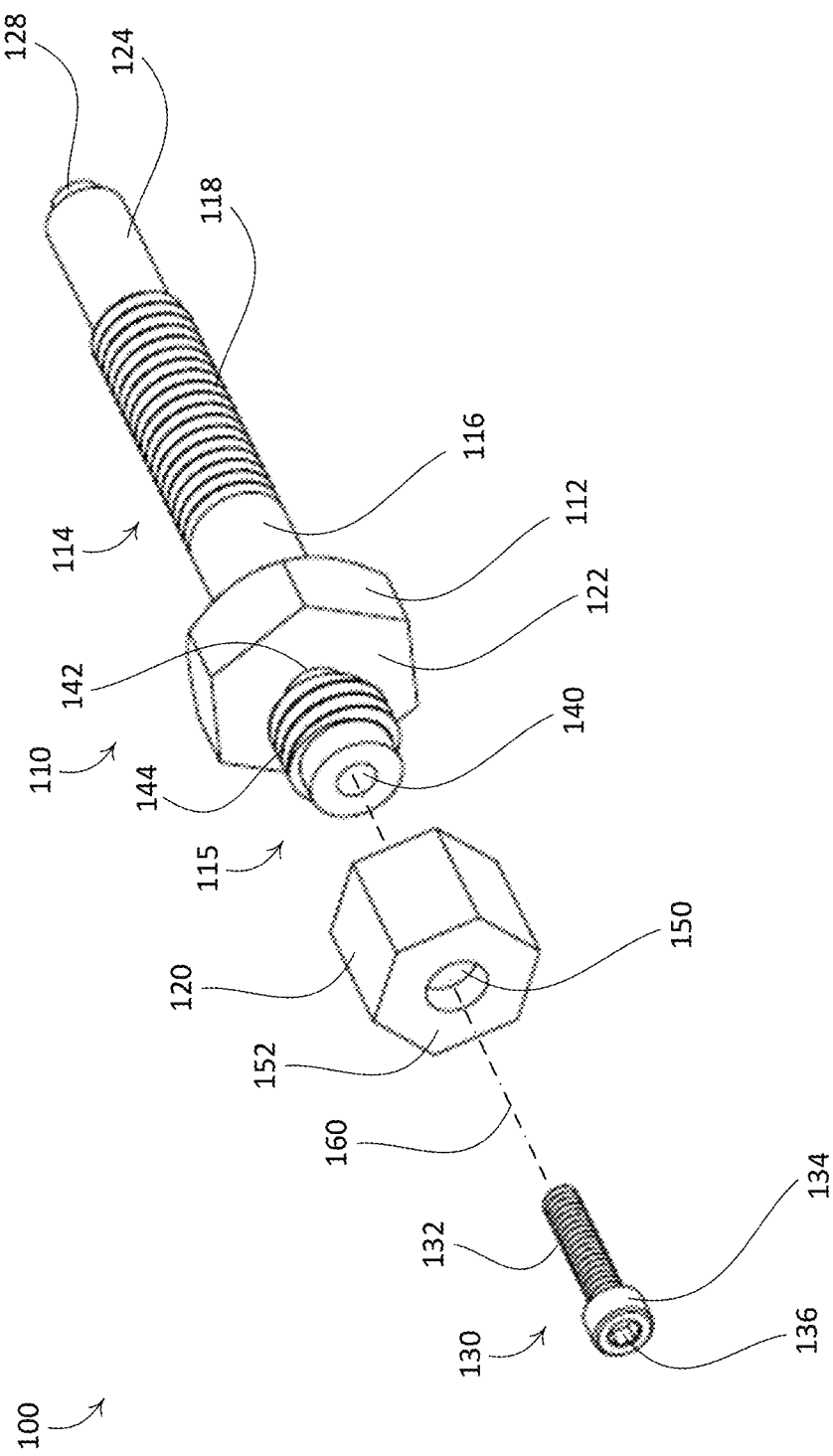
FIGS. 1C and 1D are exploded views of the example captive shear bolt assembly shown in FIG. 1A.
Figure 1D:
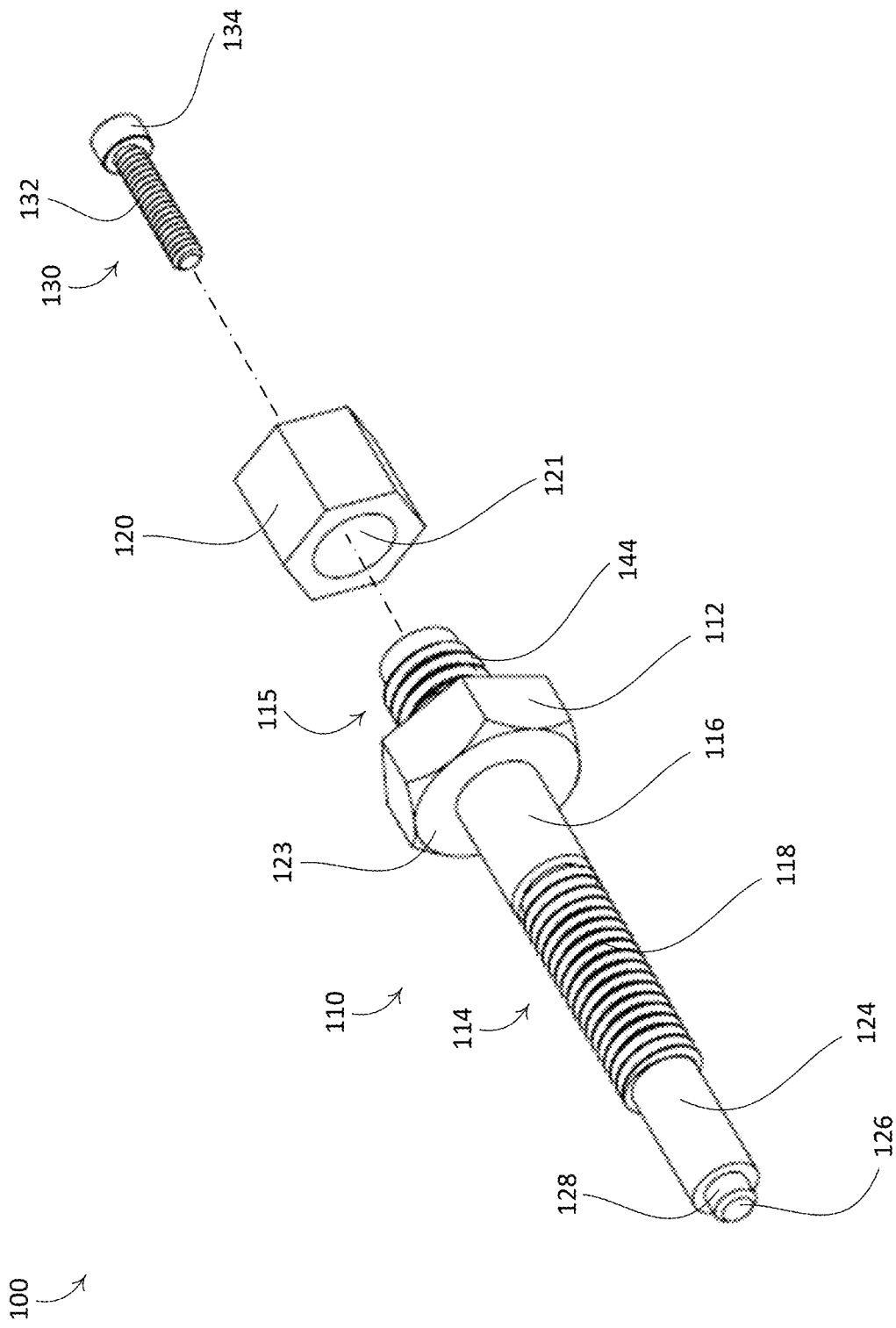

FIGS. 1A-1D depict an example captive shear bolt assembly 100. The example captive shear bolt assembly may include a bolt 110, a cap nut 120, and a screw 130. The bolt 110 may include a head 112, a shank 114, and a stud 115. The head 112 may be hexagonal. The head 112 may define a top surface 122 and a bottom surface 123. The stud 115 may extend from the top surface 122. The shank 114 may extend from the bottom surface 123. The shank 114 may include a shoulder 116, a threaded portion 118, a non-threaded portion 124, and a protrusion 128. The shoulder 116 may be between the bottom surface 123 of the head 112 and the threaded portion 118. The threaded portion 118 may be between the shoulder 116 and the non-threaded portion 124. The non-threaded portion 124 may have a first cross-sectional area that is less than or equal to a minor diameter of the threaded portion 118. The protrusion 128 may define the distal end 126 of the shank 114. The protrusion 128 may have a second cross sectional area that is less than the first cross sectional area of the threaded portion 118. The protrusion 128 may be configured to accept a lock washer or a retaining ring. For example, a retaining ring may be radially or axially installed onto the protrusion 128.

The bolt 110 may define a cavity 140. The cavity 140 may be located (e.g., centered) at an axis of rotation 160 of the bolt 110. The cavity 140 may extend through the stud 115 and the head 112. The cavity 140 may extend partially into the shank 114. The cavity 140 may be configured to receive the screw 130. For example, the cavity 140 may include internal threads 146. The internal threads 146 of the cavity 140 may begin after the shear section 142.

The stud 115 may be threaded. For example, the stud 115 may include external threads 144. The stud 115 may define a shear section 142. The shear section 142 may be between the top surface 122 of the head 112 and the external threads 144. The shear section 142 may define a tapered cross section with a first diameter at the top surface 122 of the head 112 and a second diameter at a start of the external threads 144. The first diameter may be greater than the second diameter. The shear section 142 may be configured to shear at or above a threshold torque. For example, the second diameter may be determined based on the threshold torque.

The cap nut 120 may be hexagonal (e.g., a hexagonal cap nut). The cap nut 120 may define an orifice 150 on the top surface 152 of the cap nut 120. The orifice 150 may be configured to receive the screw 130. For example, the orifice may receive one or more threads 132 of the screw 130 and/or a head 134 of the screw 130. The cap nut 120 may include internal threads that allow the cap nut 120 to be threaded onto the stud 115. When the cap nut 120 is threaded onto the stud 115, the orifice 150 may be aligned with the cavity 140 such that the screw 130 may be installed in the cavity 140 through the orifice 150.

The screw 130 may include threads 132 and a head 134. The head 134 may define a recessed drive hole 136. The recessed drive hole 136 may be configured to receive a hexagonal (e.g., such as an Allen wrench) drive.

The cap nut 120 may be threaded onto the bolt 110. For example, the cap nut 120 may be threaded onto the external threads 144 of the stud 115. The screw 130 may be inserted into the cavity 140 via the orifice 150. The captive shear bolt assembly 100 may be configured to be driven at the cap nut 120. As torque is applied to the cap nut 120, the captive shear bolt assembly 100 may rotate as the threaded portion 118 engages complementary threads. When the applied torque exceeds a threshold torque, the shear section 142 of the stud 115 may shear such that the cap nut 120 and the stud 115 are mechanically decoupled from the threaded portion 118 of the bolt. For example, when the shear section 142 shears, the cap nut 120 may no longer drive the threaded portion 118 of the bolt 110. When the shear section 142 of the stud 115 shears, the screw 130 may captively secure the cap nut 120 and the stud 115 to the bolt 110. For example, the screw 130 may engage threads in the head 112 portion of the cavity 140.

Figure 2A:
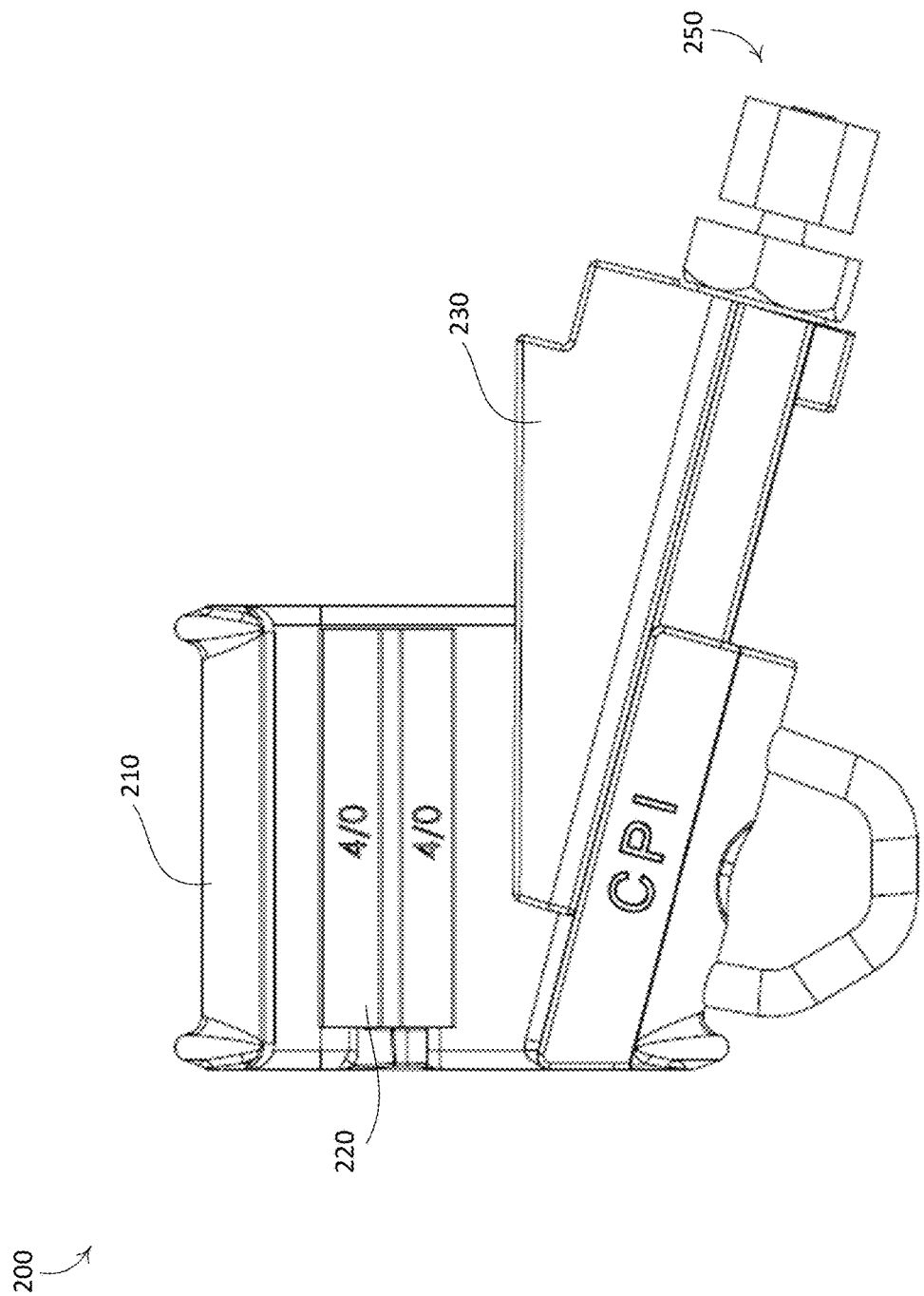
FIG. 2A is an example tap connector that includes a captive shear bolt assembly.
Figure 2B:
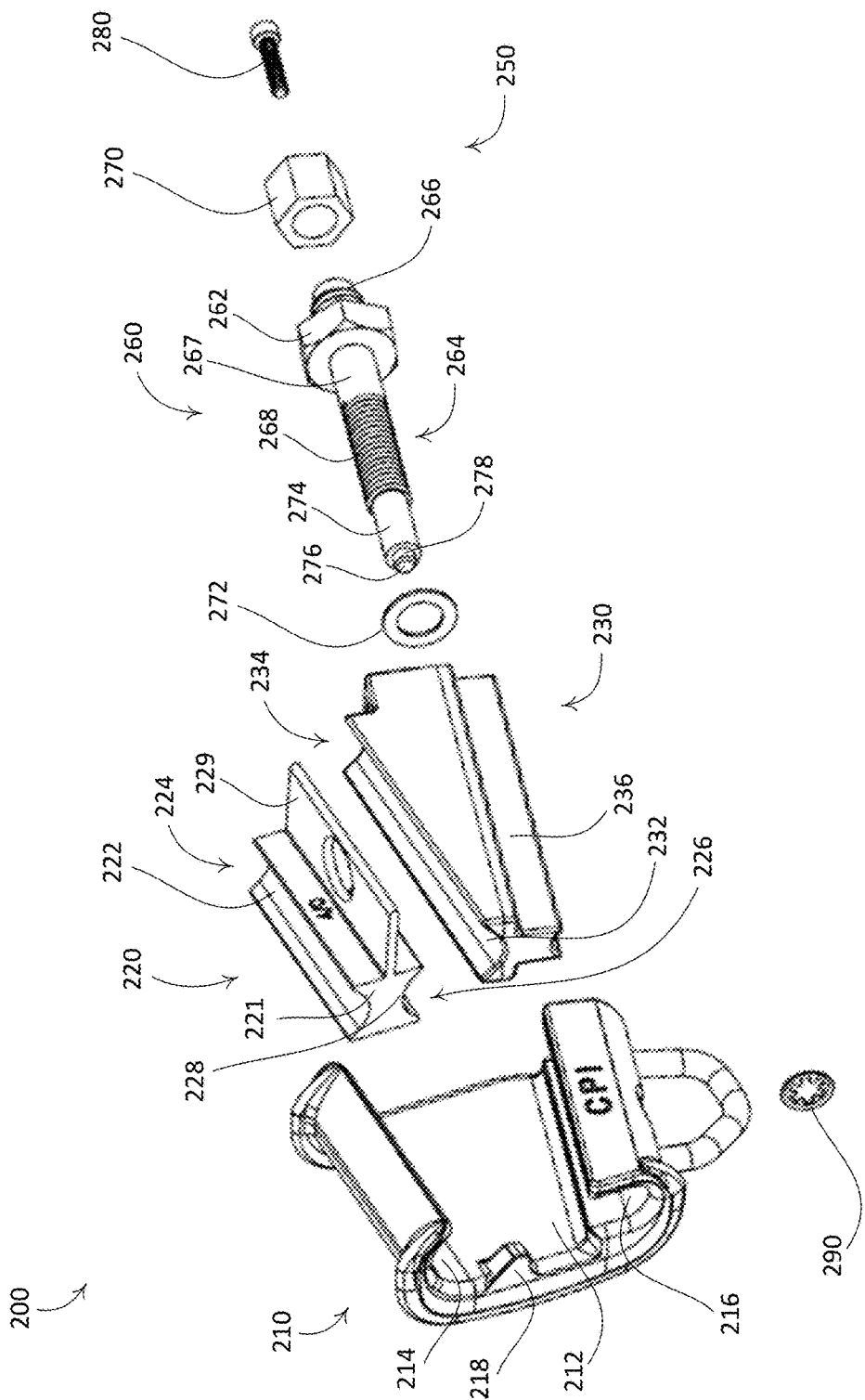
FIG. 2B is an exploded view of the example tap connector shown in FIG. 2A.

FIGS. 2A-2B depict an example tap connector 200 that includes a captive shear bolt assembly 250. The example tap connector 200 may include a body member 210, a conductor interface insert 220, and a wedge 230. The tap connector 200 may be configured to electrically and mechanically connect a main conductor (e.g., such as a transmission conductor, not shown) to a tap conductor (e.g., such as a distribution conductor, not shown).

The body member 210 may be substantially C-shaped. For example, the body member 210 may have a rear wall 212, a curved top wall 214 and a curved bottom wall 216. The curved top wall 214 may be configured to receive the distribution connector. For example, the curved top wall 214 of the tap connector 200 may fit partially around the main conductor. The curved bottom wall 216 may be configured to receive the wedge 230. The rear wall 212 may be substantially flat. The rear wall 212 may define a stop 218 that extends away from the rear wall 212.

The conductor interface insert 220 may be located between the main conductor and the tap conductor. The conductor interface insert 220 may be elongated in shape having a length substantially the same as the body member 210. An upper surface 224 of the conductor interface insert 220 may define a first recess 222. A lower surface 226 of the conductor interface insert 220 may define a second recess 228. The first recess 222 and the second recess 228 may be similarly shaped. The first recess 222 may be configured to receive (e.g., partially receive) the main conductor. The second recess 228 may be configured to receive (e.g., partially receive) the tap conductor. A handle 229 may extend from the conductor interface insert 220. The handle 229 may extend beyond the body member 210. The handle 229 may be held by a pair of pliers so that the same can be easily moved into or out of place in the tap connector 200.

The handle 229 may be held by a hot stick (not shown), for example, during live work. A hot stick may be an insulated pole used when working on energized connectors and/or conductors.

The transmission and tap conductors may be of substantially the same diameter. Accordingly, the first and second recesses 222, 228 of the conductor interface insert 220 may have substantially the same configuration and/or diameter of curvature. In some applications, however, it may be desirable to connect a tap conductor of smaller diameter with a larger diameter main conductor or a tap conductor of larger diameter with a smaller diameter main conductor. The conductor interface insert 220 may define recesses with different diameters of curvature.

The wedge 230 may include a recess 232 along an elongated upper surface 234. The recess 232 may be configured to receive the distribution connector. For example, the recess 232 may cooperate with a bottom surface of the tap conductor. The wedge 230 may include a slide 236 that is configured to guide the wedge 230 into the body member 210. For example, the slide 236 may be received within the curved bottom wall 216 of the body member 210.

The tap connector may include a first tab and a second tab. The first tab may extend (e.g., downwardly) from the wedge 230. The first tab may define a first aperture passing therethrough. The second tab may extend (e.g., downwardly) from the body member 210. The second tab may define a second aperture passing therethrough. The second aperture may be threaded. For example, the second aperture may define threads that are complementary to the threads of the captive shear bolt assembly 250. The first tab and the second tab may be configured substantially complementary to the cross-sectional shape of the curved bottom wall 216 such that the first and second tabs in cooperation with the curved bottom wall 216 guide the wedge 230 as it moves into and out of the body member 210.

The captive shear bolt assembly 250 (e.g., such as the example captive shear bolt assembly shown in FIGS. 1A-1D) may include a bolt 260, a cap nut 270, and a screw 280. The bolt 260 may include a head 262, a shank 264, and a threaded stud 266. The head 262 may be hexagonal. The threaded stud 266 may extend from the head 262. The shank 264 may extend from the head 262, for example, in an opposite direction than the threaded stud 266. The shank 264 may include a shoulder 267, a threaded portion 268, a non-threaded portion 274, and a protrusion 278. The shoulder 267 may be between the head 262 and the threaded portion 268. The threaded portion 268 may be between the shoulder 267 and the non-threaded portion 274. The non-threaded portion 274 may have a first cross-sectional area that is less than or equal to a minor diameter of the threaded portion 268. The protrusion 278 may define the distal end 276 of the shank 264. The protrusion 278 may have a second cross sectional area that is less than the first cross sectional area of the threaded portion 268. The protrusion 278 may be configured to accept a retainer 290. The retainer 290 may be a lock washer or a retaining ring that may be radially or axially installed onto the protrusion 278. The retainer 290 may be configured to retain the captive shear bolt assembly 250 within the tap connector 200.

The captive shear bolt assembly 250 may be received by the first and second apertures of the first and second tabs. For example, the shank 264 of the captive shear bolt assembly 250 may be received by the first and second apertures. A washer 272 may be received by the shank 264 such that when installed, the washer 272 is in contact with the head 262 and the wedge 230. A second retainer (not shown) may be received by the shank 264. The second retainer may be a lock washer or a retaining ring. For example, the second retainer may be radially or axially installed on the shank 264 after the shank 264 extends through the first tab.

When the captive shear bolt assembly 250 is rotated in a clockwise direction, the captive shear bolt assembly is threaded into the second aperture of the second tab and the head 262 applies a force to the first tab such that the entire wedge 230 is moved within the body member 210. For example, the slide 236 is moved within the curved bottom wall 216 of the body member 210. When the wedge 230 is moved within the body member 210, the upper surface 234 of the wedge 230 moves upwardly toward the curved top wall 214. When the captive shear bolt assembly 250 is rotated in a counter clockwise direction, the wedge 230 may move away from the body member 210. For example, the second retainer may abut the first tab such that the second retainer applies a force to the first tab that moves the wedge 230 away from the body member 210. When the wedge 230 is moved away from the body member 210, the upper surface 234 of the wedge 230 may move downwardly away from the curved top wall 214.

The tap connector 200 may be configured such that it is assembled without the conductor interface insert 220 in place. The captive shear bolt assembly 250 may be in a position such that the wedge 230 is substantially withdrawn from the body member 210. The tap connector 200 may be suspended from a main conductor by resting the curved top wall 214 of the body member 210 around the main conductor. A tap conductor may be laid across the upper surface 234 of the wedge 230. The conductor interface insert 220 may be positioned between the transmission and tap conductors, for example, outside of the body member 210. The conductor interface insert 220 may be moved toward the interior of the body member 210, for example, using the conductors as a guide. The conductor interface insert 220 may be moved until a leading surface 221 of the conductor interface insert 220 contacts the stop 218.

With the conductor interface insert 220 in place, the captive shear bolt assembly 250 may be rotated such that the wedge 230 is moved toward interior of the body member 210. The captive shear bolt assembly 250 may be rotated via the cap nut 270. As the wedge 230 is moved into the interior of the body member 210, the recess 232 is moved into contact with the tap conductor which in turn is forced against the second recess 228 on the lower surface 226 of the conductor interface insert 220. The first recess 222 on the upper surface 224 of the conductor interface insert 220 may be forced into contact the main conductor which in turn is forced into contact with the curved top wall 214 of the body member 210. The captive shear bolt assembly 250 may be configured to shear at a threshold torque. For example, the threshold torque may be determined such that it corresponds to the wedge 230 being in its proper position and sufficient pressure being placed on the conductors so as to provide a proper connection. The captive shear bolt assembly 250 may shear at the threaded stud 266. The screw 280 may be configured to retain the cap nut 270 and the threaded stud 266 to the bolt 260 when the threaded stud 266 shears.

Figure 3A:
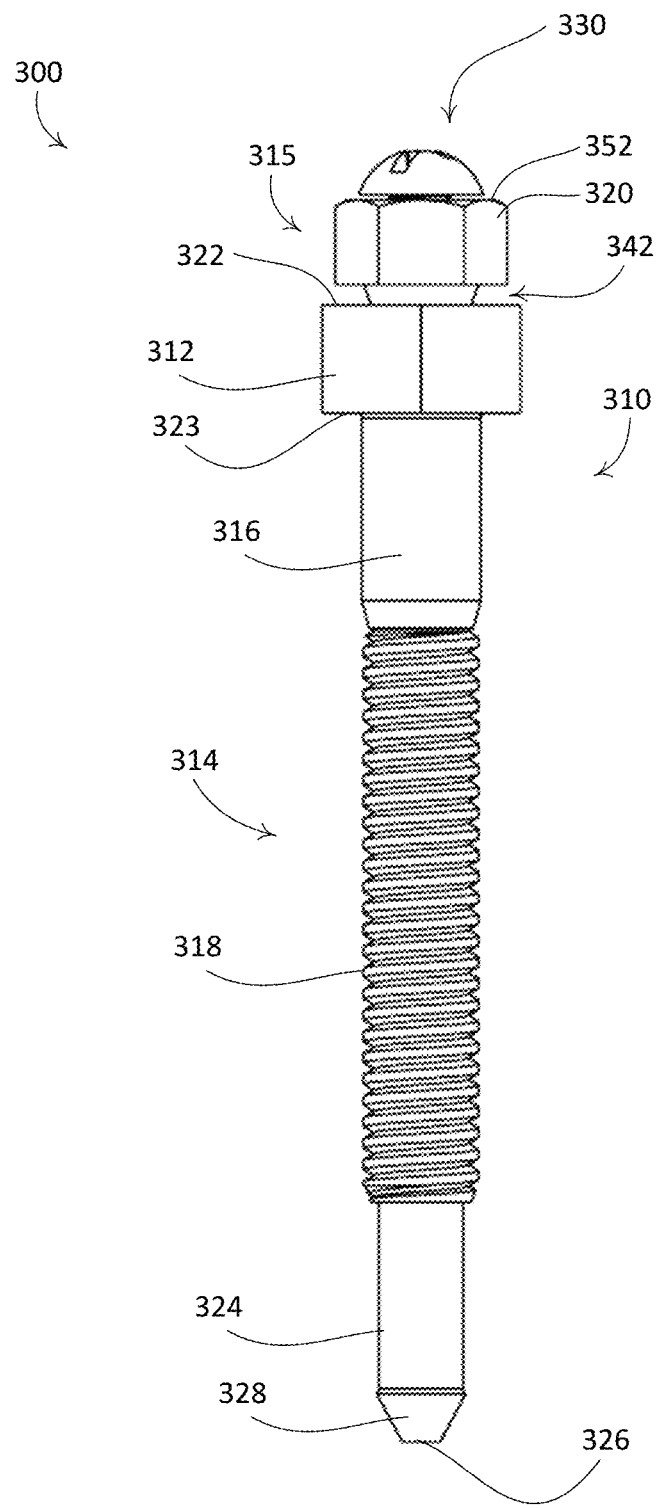
FIG. 3A is another example captive shear bolt assembly.
Figure 3B:
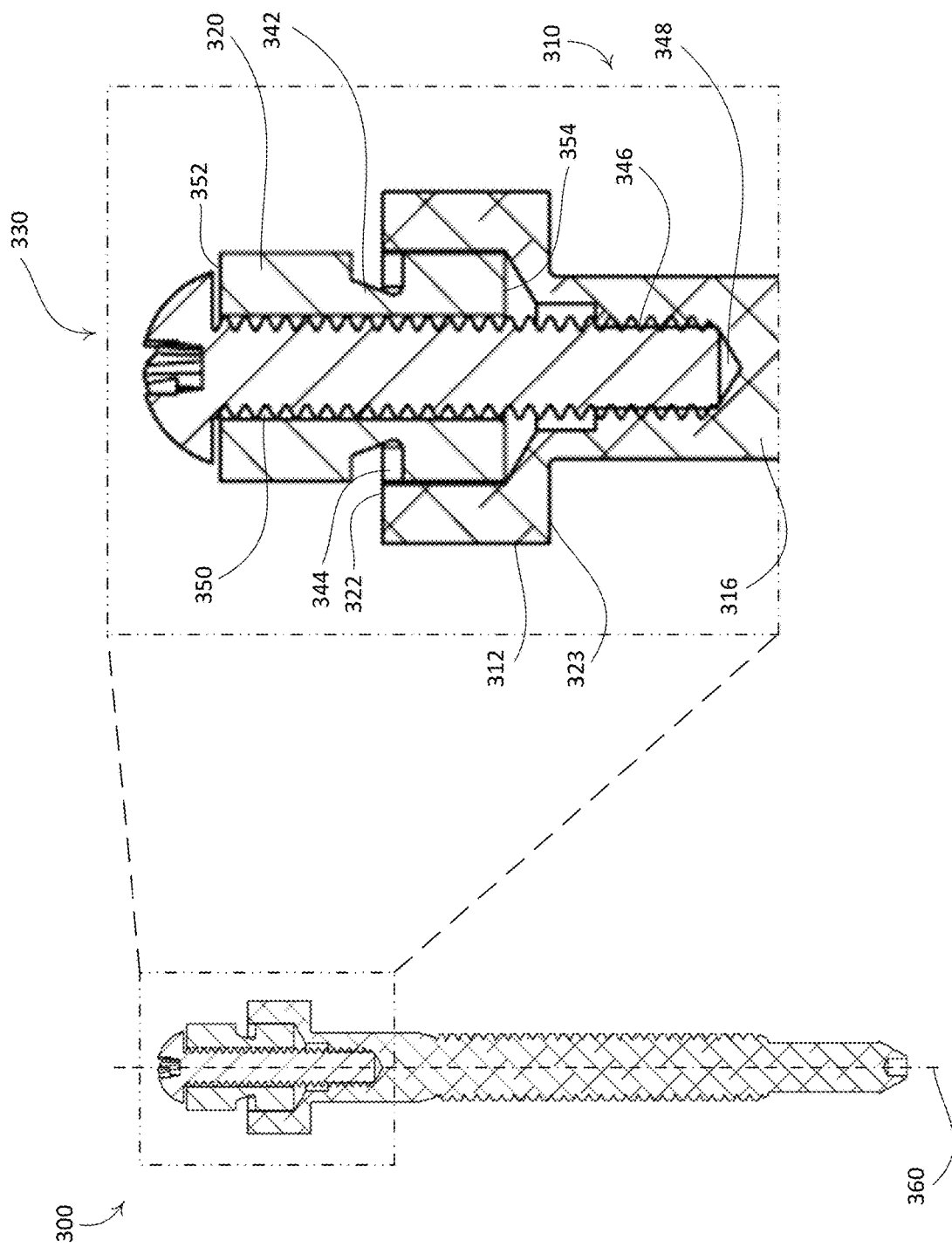
FIG. 3B is a cross-section view of the example captive shear bolt assembly shown in FIG. 3A.
Figure 3C:
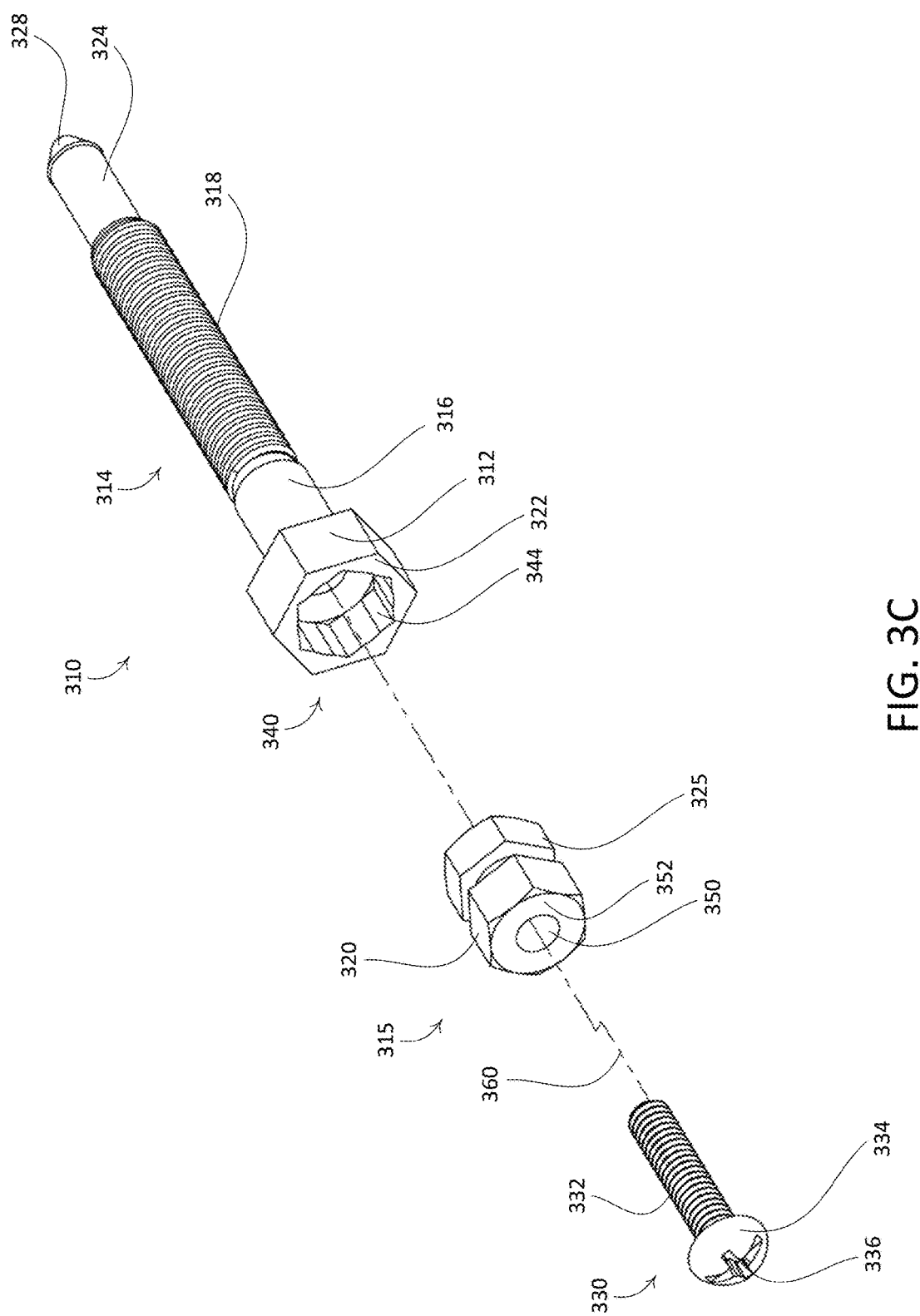
FIG. 3C is an exploded view of the example captive shear bolt assembly shown in FIG. 3A.

FIGS. 3A-3C depict another example captive shear bolt assembly 300. The example captive shear bolt assembly 300 may include a bolt 310, a shear coupling 315, and a screw 330. The bolt 310 may include a head 312 and a shank 314. The head 312 may be hexagonal. The head 312 may define a top surface 322 and a bottom surface 323. The shank 314 may extend from the bottom surface 323. The shank 314 may include a shoulder 316, a threaded portion 318, a non-threaded portion 324, and a protrusion 328. The shoulder 316 may be between the bottom surface 323 of the head 312 and the threaded portion 318. The threaded portion 318 may be between the shoulder 316 and the non-threaded portion 324. The non-threaded portion 324 may have a first cross-sectional area that is less than or equal to a minor diameter of the threaded portion 318. The protrusion 328 may define the distal end 326 of the shank 314. The protrusion 328 may have a second cross sectional area that is less than the first cross sectional area of the threaded portion 318. The protrusion 328 may be tapered from the shank 314 to the distal end 326. The protrusion 328 may be configured to accept a retainer (e.g., such as a retaining ring and/or a lock washer).

The shear coupling 315 may define an upper head 320, a lower head 325, and a shear section 342. The upper head 320 and/or the lower head 325 may be hexagonal-shaped. For example, the upper head 320 may be a first hexagonal nut and the lower head 325 may be a second hexagonal nut. The upper head 320 and the lower head 325 may be connected by the shear section 342. The upper head 320 may be configured to receive an external torque. The shear section 342 may define a tapered cross section with a first diameter at the upper head 320 and a second diameter at the lower head 325. The first diameter may be greater than the second diameter. The shear section 342 may be configured to shear at or above a threshold torque. For example, one or more of the second diameter, the material, and/or the thickness of the shear section 342 may be determined based on the threshold torque.

The shear coupling 315 may define an orifice 350. The orifice 350 may extend through the upper head 320, the shear section 342, and the lower head 325. For example, the orifice 350 may start at a top surface 352 of the upper head 320 and may terminate at a bottom surface 354 of the lower head 325. The orifice 350 may be configured to receive the screw 330. For example, the orifice may receive one or more threads 332 of the screw 330 and/or a head 334 of the screw 330.

The bolt 310 may define a cavity 340. The cavity 340 may be located (e.g., centered) at an axis of rotation 360 of the bolt 310. The cavity 340 may extend through the head 312. The cavity 340 may extend partially into the shank 314. The cavity 340 may define a top portion 344 and a bottom portion 348. The top portion 344 may be hexagon-shaped. For example, the top portion 344 may be configured to receive the lower head 325 of the shear coupling 315. The top portion 344 may be configured such that a torque applied to the shear coupling 315 (e.g., the upper head 320 of the shear coupling 315) is transferred to the bolt 310. The cavity 340 may be configured to receive the screw 330. For example, the cavity 340 may include internal threads 346 (e.g., female threads). The internal threads 346 of the cavity 340 may begin after the shear section 342. When the shear coupling 315 is inserted into the head 312, the orifice 350 may be aligned with the cavity 340 such that the screw 330 may be installed in the cavity 340 through the orifice 350.

The screw 330 may include threads 332 and a head 334. The head 334 may define a drive recess 336. The head 334 may be a Phillips (e.g., crosshead) screw head. For example, the drive recess 336 may be configured to receive a Phillips-head drive. Although, the drive recess 336, as shown, may be configured to receive a Phillips-head drive, the head 334 may be configured to receive another type of drive. For example, the head 334 may be configured to receive a flat head drive, a Torx drive, a square drive, a hex socket drive, etc.

The shear coupling 315 may be inserted into the cavity 340. For example, the lower head 325 of the shear coupling 315 may be inserted into the top portion 344 of the cavity 340. The screw 330 may be inserted into the cavity 340 via the orifice 350 in the shear coupling 315. The threads 332 of the screw 330 may engage internal threads 346 in the bottom portion 348 of the cavity 340. The captive shear bolt assembly 300 may be configured to be driven at the shear coupling 315, for example, the upper head 320 of the shear coupling 315. As torque is applied to the upper head 320, the captive shear bolt assembly 300 may rotate as the threaded portion 318 engages complementary threads. When the applied torque exceeds a threshold torque, the shear section 342 of the shear coupling 315 may shear such that the upper head 320 is mechanically decoupled from the threaded portion 318 of the bolt 310. For example, when the shear section 342 shears, the upper head 320 may no longer drive the threaded portion 318 of the bolt 310. When the shear section 342 of the shear coupling 315 shears, the screw 330 may captively secure the upper head 320 to the bolt 310. For example, the screw 330 may engage the internal threads 346 in the bottom portion 348 of the cavity 340 such that the shear coupling 315 remains coupled to the bolt 310 when the shear section 342 has sheared.

The captive shear bold assembly 300 may be configured to be reused. For example, when the shear section 342 has sheared, the screw 330 may be removed such that the shear coupling 315 may be removed. A replacement shear coupling may be installed such that the captive shear bolt assembly 300 can be reused.

Figure 4A:
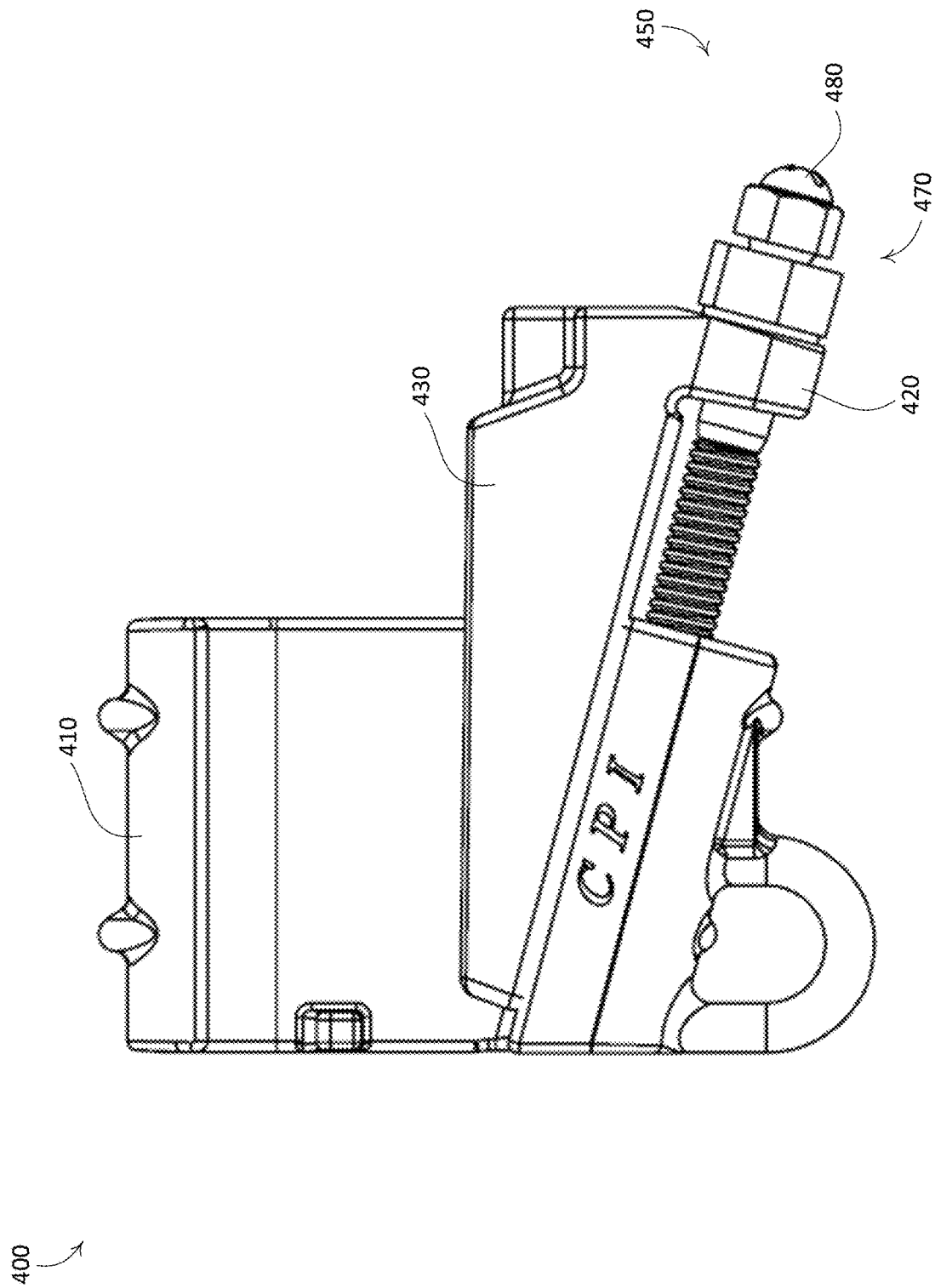
FIG. 4A is another example tap connector that includes a captive shear bolt assembly.
Figure 4B:
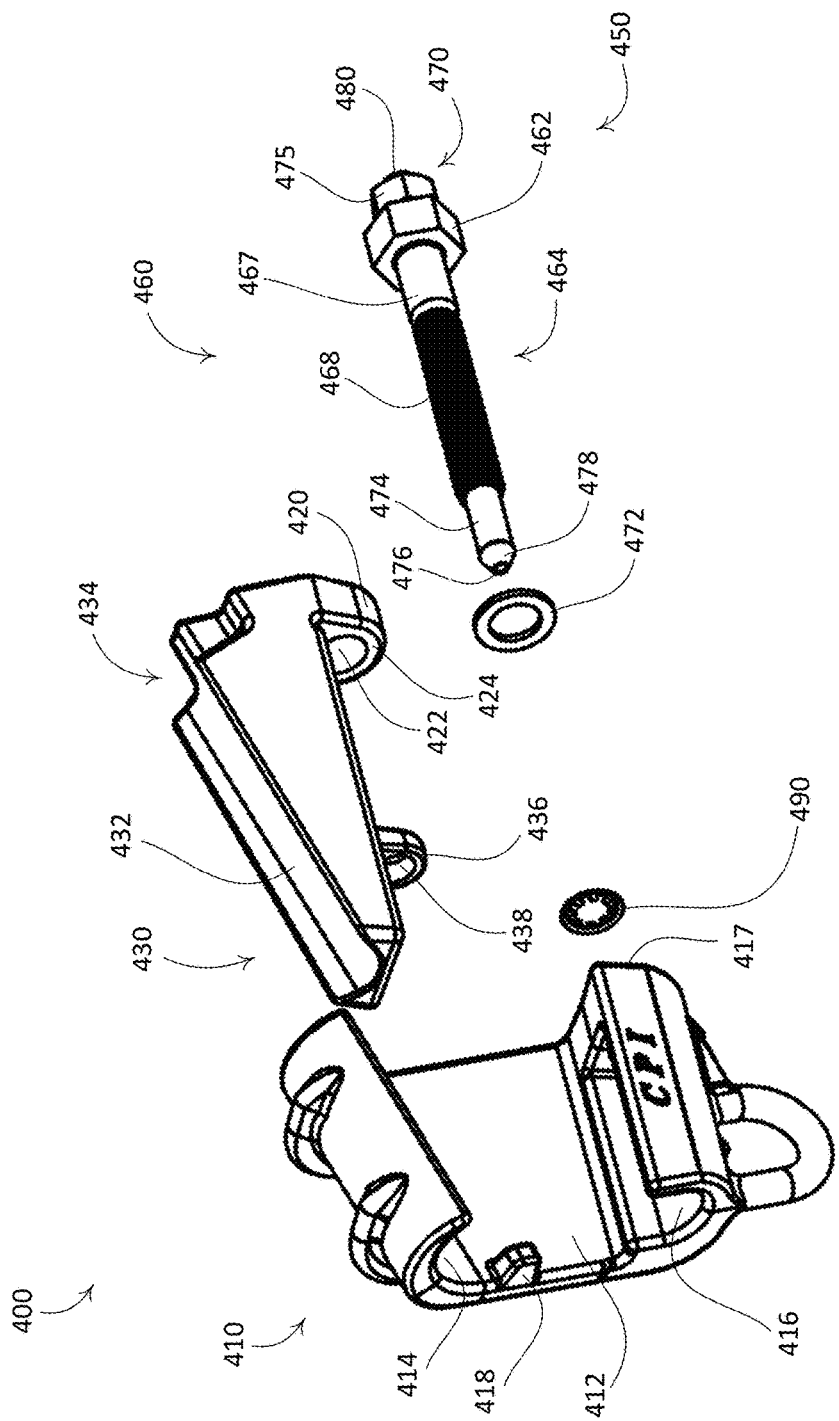
FIG. 4B is an exploded view of the example tap connector shown in FIG. 4A.

FIGS. 4A-4B depict an example tap connector 400 that includes a captive shear bolt assembly 450 (e.g., such as the captive shear bolt assembly 300 shown in FIGS. 3A-3C). The example tap connector 400 may include a body member 410, a conductor interface insert (not shown), and a wedge 430. The tap connector 400 may be configured to electrically and mechanically connect a main conductor (not shown) to a tap conductor (not shown).

The body member 410 may be substantially C-shaped. For example, the body member 410 may have a rear wall 412, a curved top wall 414 and a curved bottom wall 416. The curved top wall 414 may be configured to receive the distribution connector. For example, the curved top wall 414 of the tap connector 400 may fit partially around the main conductor. The curved bottom wall 416 may be configured to receive the wedge 430. The rear wall 412 may be substantially flat. The rear wall 412 may define a stop 418 that extends away from the rear wall 412.

The conductor interface insert may be located between the main conductor and the tap conductor. The conductor interface insert may be elongated in shape having a length substantially the same as the body member 410. An upper surface of the conductor interface insert may define a first recess. A lower surface of the conductor interface insert may define a second recess. The first recess and the second recess may be similarly shaped. The first recess may be configured to receive (e.g., partially receive) the main conductor. The second recess may be configured to receive (e.g., partially receive) the tap conductor. A handle may extend from the conductor interface insert. The handle may extend beyond the body member. The handle may be held by a pair of pliers so that the same can be easily moved into or out of place in the tap connector 400. The handle may be held by a hot stick (not shown), for example, during live work. A hot stick may be an insulated pole used when working on energized connectors and/or conductors.

The transmission and tap conductors may be of substantially the same diameter. Accordingly, the first and second recesses of the conductor interface insert may have substantially the same configuration and/or diameter of curvature. In some applications, however, it may be desirable to connect a tap conductor of smaller diameter with a larger diameter main conductor or a tap conductor of larger diameter with a smaller diameter main conductor. The conductor interface insert may define recesses with different diameters of curvature.

The wedge 430 may include a recess 432 along an elongated upper surface 434. The recess 432 may be configured to receive the distribution connector. For example, the recess 432 may cooperate with a bottom surface of the tap conductor. The wedge 430 may include a slide 436 that is configured to guide the wedge 430 into the body member 410. For example, the slide 436 may be received within the curved bottom wall 416 of the body member 410. The slide 436 may be configured substantially complementary to the cross-sectional shape of the curved bottom wall 416 such that the slide 436, in cooperation with the curved bottom wall 416, is configured to guide the wedge 430 as it moves into and out of the body member 410. The slide 436 may define an orifice 438 that may be configured to receive the captive shear bolt assembly 450.

The wedge may define a tab 420. The tab 420 may extend (e.g., downwardly) from the wedge 430. The tab 420 may define an aperture 422 passing therethrough. The tab 420 may be configured substantially complementary to the cross-sectional shape of the curved bottom wall 416 such that a rear wall 424 of the tab 420 is configured to engage (e.g., align with) a front wall 417 of the body member 410.

The captive shear bolt assembly 450 (e.g., such as the example captive shear bolt assembly 300 shown in FIGS. 3A-3C) may include a bolt 460, a shear coupling 470, and a screw 480. The bolt 460 may include a head 462, a shank 464, and a threaded stud 466. The head 462 may be hexagonal. The threaded stud 466 may extend from the head 462. The shank 464 may include a shoulder 467, a threaded portion 468, a non-threaded portion 474, and a protrusion 478. The shoulder 467 may be between the head 462 and the threaded portion 468. The threaded portion 468 may be between the shoulder 467 and the non-threaded portion 474. The non-threaded portion 474 may have a first cross-sectional area that is less than or equal to a minor diameter of the threaded portion 468. The protrusion 478 may define the distal end 476 of the shank 464. The protrusion 478 may have a second cross sectional area that is less than the first cross sectional area of the threaded portion 468. The protrusion 478 may be configured to accept a retainer 490. The retainer 490 may be a lock washer or a retaining ring. The retainer 490 may be configured to retain the captive shear bolt assembly 450 within the tap connector 400.

The captive shear bolt assembly 450 may be received by the aperture 422 of the tab 420 and the orifice 438 of the slide 436. For example, the shank 464 of the captive shear bolt assembly 450 may be received by the aperture 422 and the orifice 438. A washer 472 may be received by the shank 464 such that when installed, the washer 472 is in contact with the head 462 and the wedge 430. A second retainer (not shown) may be received by the shank 464. The second retainer may be a lock washer or a retaining ring. For example, the second retainer may be installed on the shank 464 after the shank 464 extends through the tab 420.

When the captive shear bolt assembly 450 is rotated in a clockwise direction, the captive shear bolt assembly 450 is threaded into the orifice 438 of the slide 436 and the head 462 applies a force to the tab 420 such that the entire wedge 430 is moved within the body member 410. For example, the slide 436 is moved within the curved bottom wall 416 of the body member 410. When the wedge 430 is moved within the body member 410, the upper surface 434 of the wedge 430 moves upwardly toward the curved top wall 414. When the captive shear bolt assembly 450 is rotated in a counter clockwise direction, the wedge 430 may move away from the body member 410. For example, the second retainer may abut the tab 420 such that the second retainer applies a force to the tab 420 that moves the wedge 430 away from the body member 410. When the wedge 430 is moved away from the body member 410, the upper surface 434 of the wedge 430 may move downwardly away from the curved top wall 414.

The tap connector 400 may be configured such that it is assembled without the conductor interface insert in place. The captive shear bolt assembly 450 may be in a position such that the wedge 430 is substantially withdrawn from the body member 410. The tap connector 400 may be suspended from a main conductor by resting the curved top wall 414 of the body member 410 around the main conductor. A tap conductor may be laid across the upper surface 434 of the wedge 430. The conductor interface insert may be positioned between the transmission and tap conductors, for example, outside of the body member 410. The conductor interface insert may be moved toward the interior of the body member 410, for example, using the conductors as a guide. The conductor interface insert may be moved until a leading surface of the conductor interface insert contacts the stop 418.

With the conductor interface insert in place, the captive shear bolt assembly 450 may be rotated such that the wedge 430 is moved toward interior of the body member 410. The captive shear bolt assembly 450 may be rotated via the upper head 475. As the wedge 430 is moved into the interior of the body member 410, the recess 432 is moved into contact with the tap conductor which in turn is forced against a second recess on the lower surface of the conductor interface insert. A first recess on the upper surface of the conductor interface insert may be forced into contact the main conductor which in turn is forced into contact with the curved top wall 414 of the body member 410. The captive shear bolt assembly 450 may be configured to shear at a threshold torque. For example, the threshold torque may be determined such that it corresponds to the wedge 430 being in its proper position and sufficient pressure being placed on the conductors to provide a proper connection. The captive shear bolt assembly 450 may shear at the shear coupling 470. The screw 480 may be configured to retain the upper head 475 of the shear coupling 470 to the bolt 460 when the shear section of the shear coupling 470 has sheared.

Figure 5A:
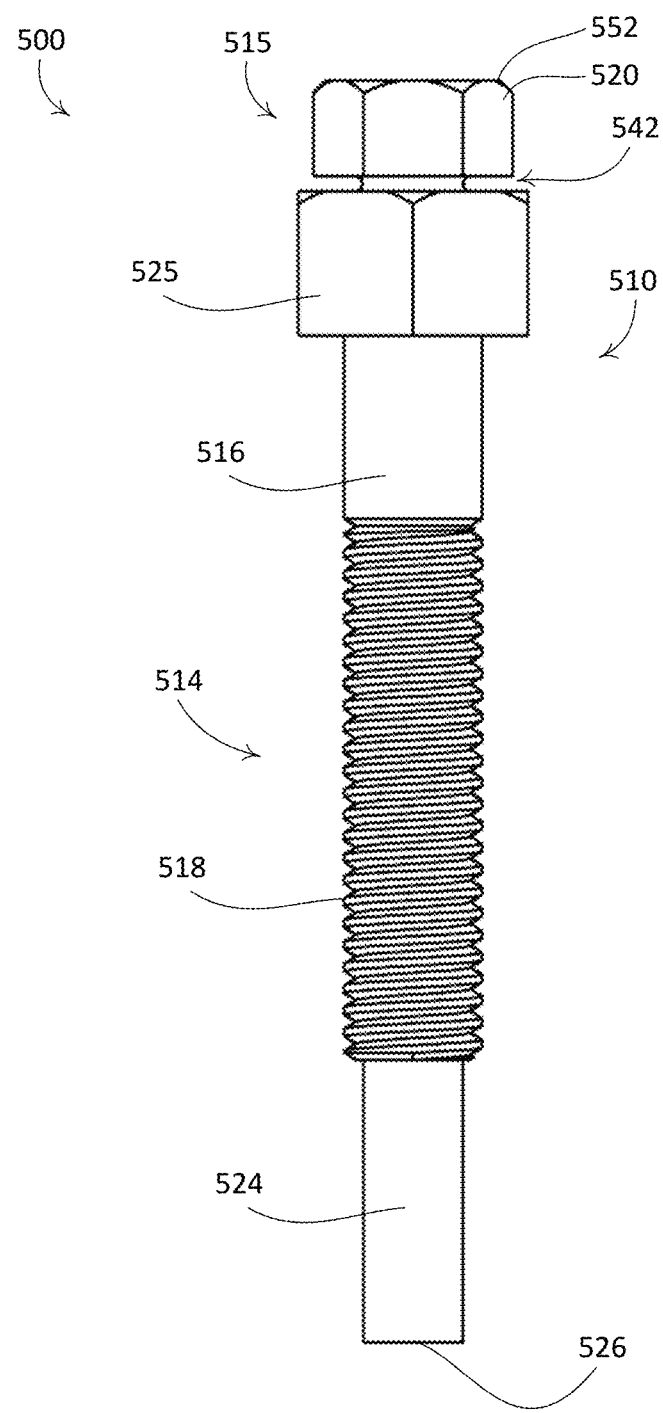
FIG. 5A is another example captive shear bolt assembly.
Figure 5B:
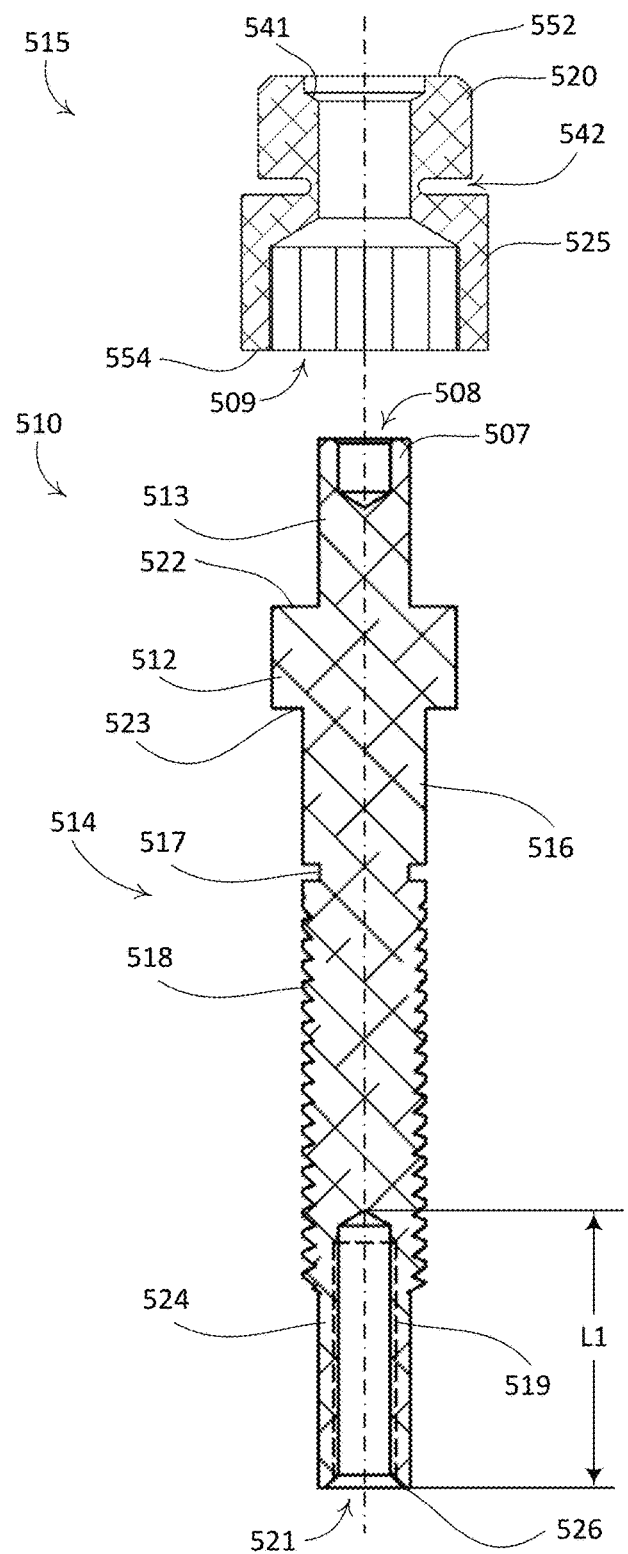
FIG. 5B is a cross-section view of the example captive shear bolt assembly shown in FIG. 5A.
Figure 5C:
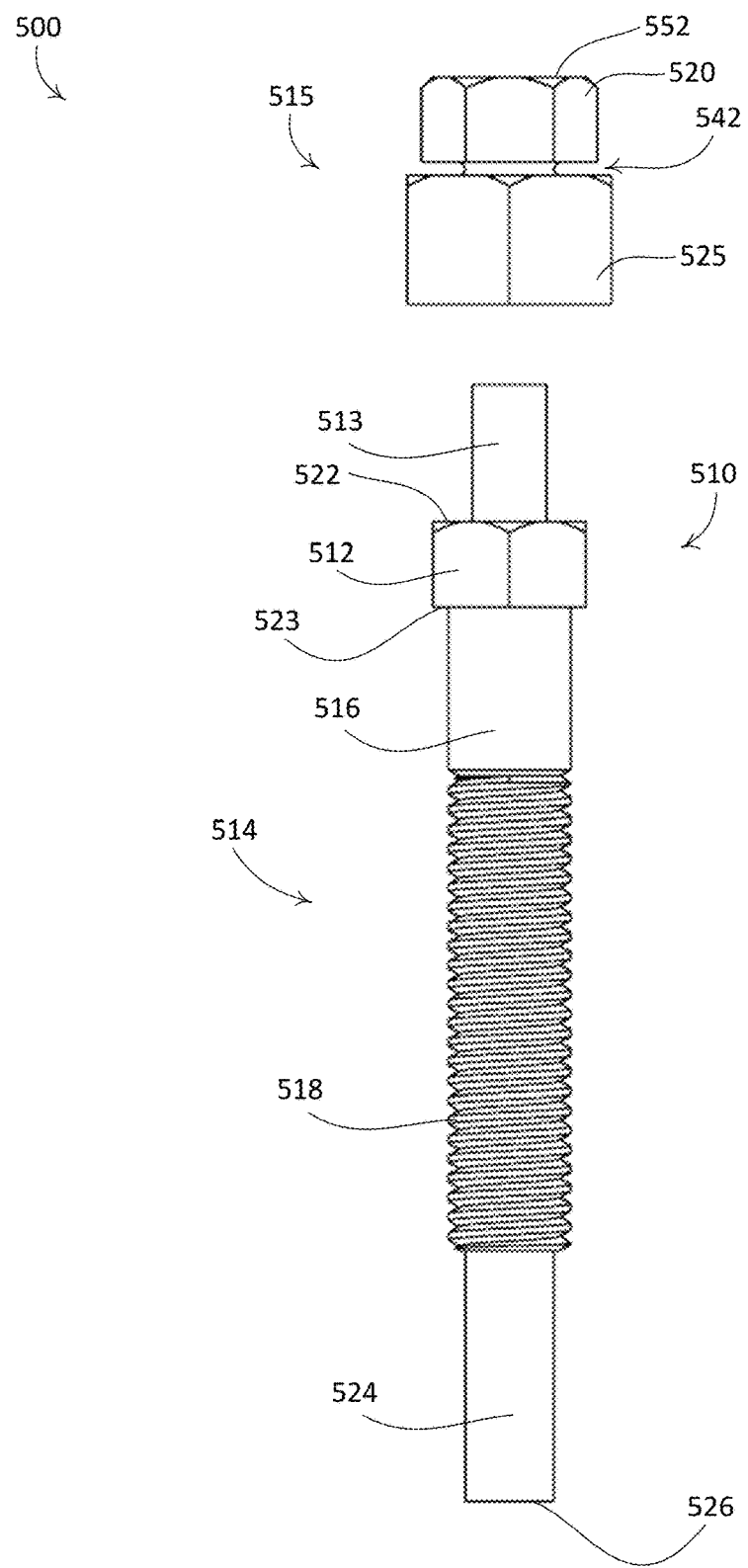
FIG. 5C is an exploded view of the example captive shear bolt assembly shown in FIG. 5A.

FIGS. 5A-5C depict another example captive shear bolt assembly 500. The example captive shear bolt assembly 500 may include a bolt 510 and a shear coupling 515. The bolt 510 may include a head 512, an extension 513, and a shank 514. The head 512 may be hexagonal, for example. The head 512 may define a top surface 522 and a bottom surface 523. The extension 513 may be cylindrically-shaped, as shown. The top surface 522 may be cylindrical, hexagonal, or some other shape. The extension 513 may define a cavity 508. The shank 514 may extend from the bottom surface 523. The shank 514 may include a shoulder 516, a threaded portion 518, and a non-threaded portion 524. The shoulder 516 may be between the bottom surface 523 of the head 512 and the threaded portion 518. The shank 514 may define a groove 517 between the shoulder 516 and the threaded portion 518. The groove 517 may be configured such that the bolt 510 is retained within a tap connector, as described herein. For example, the groove 517 may be configured to receive a retaining ring (not shown). The threaded portion 518 may be located between the shoulder 516 and the non-threaded portion 524. The non-threaded portion 524 may have a cross-sectional area that is less than or equal to a minor diameter of the threaded portion 518. The non-threaded portion 524 may be configured to receive a fastener. For example, the shank 514 may define a cavity 521. The cavity 521 may extend a distance L1 from a distal end 526 of the non-threaded portion 524 into the shank 514 and may include internal threads 519. The cavity 521 and the internal threads 519 may begin at a distal end 526 of the non-threaded portion 524. The cavity 521 and/or the internal threads 519 may extend into the non-threaded portion 524 and the threaded portion 518 of the shank 514.

The shear coupling 515 may define an upper head 520, a lower head 525, and a shear section 542. The upper head 520 and/or the lower head 525 may be hexagonal-shaped. For example, the upper head 520 may be a first hexagonal nut and the lower head 525 may be a second hexagonal nut. The upper head 520 and the lower head 525 may be connected by the shear section 542. The upper head 520 may be configured to receive an external torque. The shear coupling may be configured to transfer the external torque to the bolt 510 such that the bolt 510 rotates around its rotational axis when the external torque is applied to the upper head 520. The shear section 542 may define a tapered cross section with a first diameter at the upper head 520, a second diameter at the lower head 525, and a third diameter at a midpoint between the upper head 520 and the lower head 525. The first diameter and the second diameter may be equal. The shear section 542 may be configured to shear at or above a threshold torque. For example, one or more of the third diameter, the material, and/or the thickness of the shear section 542 may be determined and/or configured based on the threshold torque.

The shear coupling 515 may be configured to receive the extension 513 and the head 512. For example, the shear coupling 515 may define an orifice 509. The orifice 509 may extend through the upper head 520, the shear section 542, and the lower head 525. For example, the orifice 509 may start at a top surface 552 of the upper head 520 and may terminate at a bottom surface 554 of the lower head 525. The orifice 509 may be configured to receive the head 512. For example, the orifice 509 may be hexagonal-shaped within the lower head 525 such that the head 512 is received within the orifice 509. The lower head 525 may transfer an external torque to the head 512 of the bolt 510. The orifice 509 may have different shapes and or sizes within the shear coupling 515. Within the upper head 520, the orifice 509 may be shaped similar to the extension 513 such that the extension 513 is received within the orifice 509. For example, the orifice 509 may be cylindrical within the upper head 520.

The shear coupling 515 and the extension 513 may be configured such that the shear coupling 515 can be attached to the bolt 510 using a tool. For example, the extension 513 may extend above an upper inner surface 541 of the upper head 520. The upper inner surface 541 may be a shoulder defined within the orifice 509. A tool (e.g., a punch) may be used to deform an upper portion of the extension 513 such that the upper portion 507 extends onto (e.g., partially onto) the upper inner surface 541 of the upper head 520. For example, the tool may be forcibly inserted into the cavity 508. The tool may be tapered such that the further the tool is inserted within the cavity 508, the greater the upper portion 507 is deformed. The deformed upper portion 507 of the extension 513 may be configured to retain the shear coupling 515 to the bolt 510. For example, the deformed upper portion 507 of the extension 513 may be configured to prevent the shear coupling 515 from being removed from the bolt 510.

The captive shear bolt assembly 500 may be configured to be driven at the shear coupling 515, for example, the upper head 520 of the shear coupling 515. As torque is applied to the upper head 520, the captive shear bolt assembly 500 may rotate as the threaded portion 518 engages complementary threads. When the applied torque exceeds a threshold torque, the shear section 542 of the shear coupling 515 may shear such that the upper head 520 is mechanically decoupled from the threaded portion 518 of the bolt 510. For example, when the shear section 542 shears, the upper head 520 may no longer drive the threaded portion 518 of the bolt 510. When the shear section 542 of the shear coupling 515 shears, the deformed upper portion 507 of the extension 513 may captively secure the upper head 520 to the bolt 510. For example, the deformed upper portion 507 of the extension 513 may be configured such that the shear coupling 515 remains coupled to the bolt 510 when the shear section 542 has sheared.

Figure 6A:
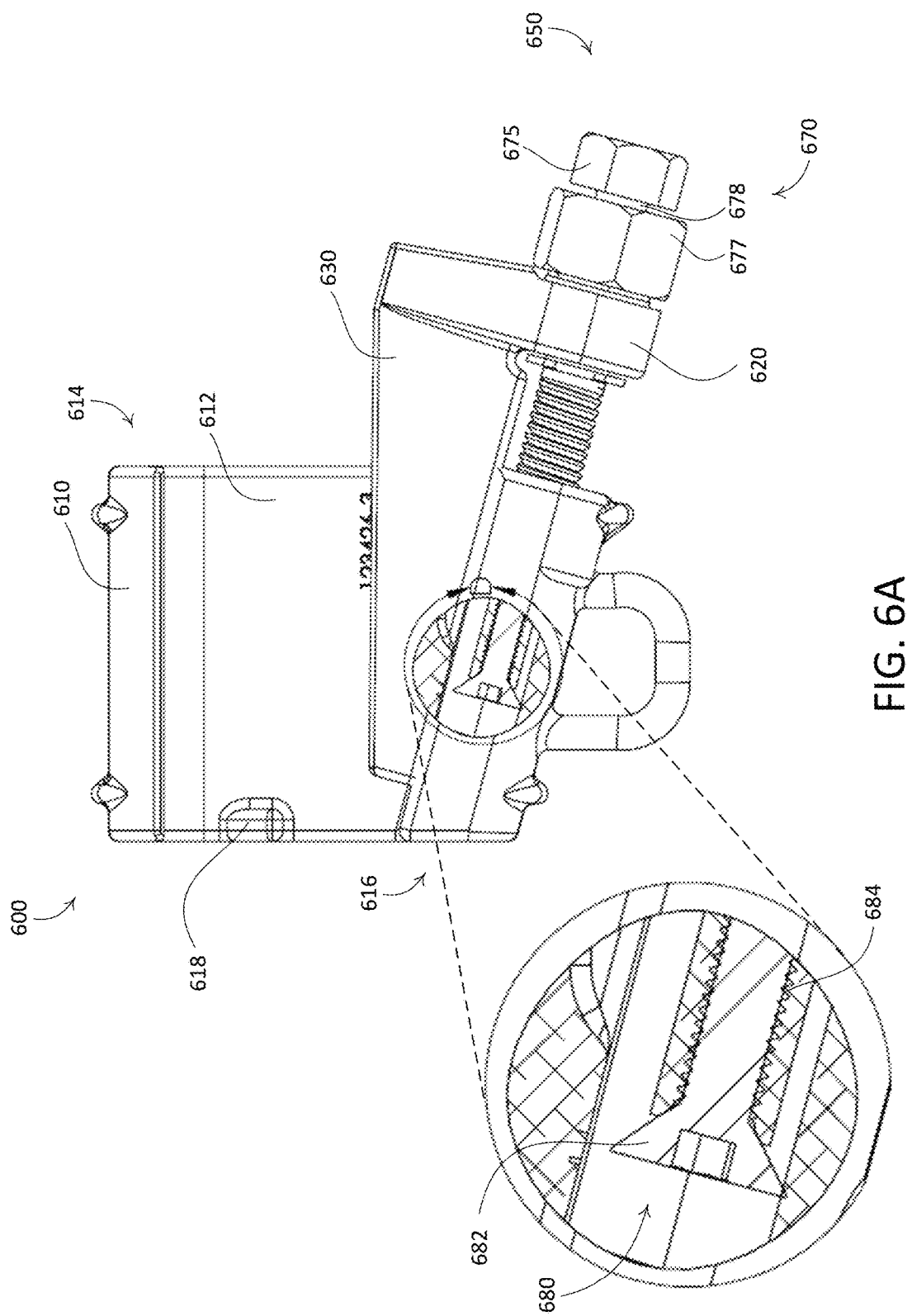
FIG. 6A is another example tap connector that includes a captive shear bolt assembly.
Figure 6B:
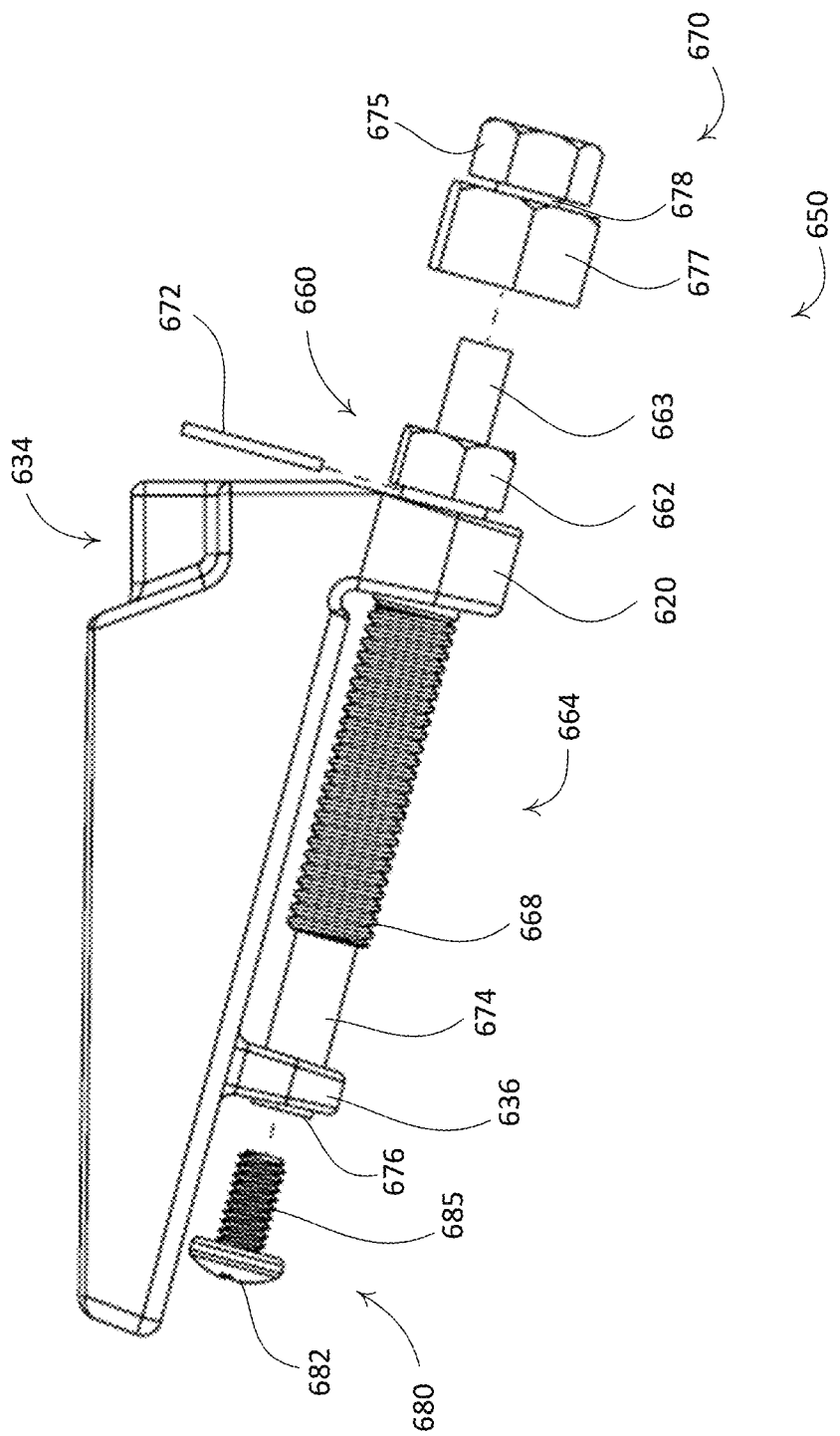
FIG. 6B is an exploded view of the example tap connector shown in FIG. 6A.

FIGS. 6A-6B depict an example tap connector 600 that includes a captive shear bolt assembly 650 (e.g., such as the captive shear bolt assembly 500 shown in FIGS. 5A-5C). The example tap connector 600 may include a body member 610, a conductor interface insert (not shown), and a wedge 630. The tap connector 600 may be configured to electrically and mechanically connect a main conductor (not shown) to a tap conductor (not shown).

The body member 610 may be substantially C-shaped. For example, the body member 610 may have a rear wall 612, a curved top wall 614 and a curved bottom wall 616. The curved top wall 614 may be configured to receive the distribution connector. For example, the curved top wall 614 of the tap connector 600 may fit partially around the main conductor. The curved bottom wall 616 may be configured to receive the wedge 630. The rear wall 612 may be substantially flat. The rear wall 612 may define a stop 618 that extends (e.g., substantially perpendicular) from the rear wall 612. The stop 618 may be configured to engage the conductor interface insert such that the conductor interface insert is prevented from extending beyond the tap connector 600.

The conductor interface insert may be located between the main conductor and the tap conductor. The conductor interface insert may be elongated in shape having a length substantially the same as the body member 610. An upper surface of the conductor interface insert may define a first recess. A lower surface of the conductor interface insert may define a second recess. The first recess and the second recess may be similarly shaped. The first recess may be configured to receive (e.g., partially receive) the main conductor. The second recess may be configured to receive (e.g., partially receive) the tap conductor. A handle may extend from the conductor interface insert. The handle may extend beyond the body member. The handle may be held by a pair of pliers so that the same can be easily moved into or out of place in the tap connector 600. The handle may be held by a hot stick (not shown), for example, during live work. A hot stick may be an insulated pole used when working on energized connectors and/or conductors.

The transmission and tap conductors may be of substantially the same diameter. Accordingly, the first and second recesses of the conductor interface insert may have substantially the same configuration and/or diameter of curvature.

In some applications, however, it may be desirable to connect a tap conductor of smaller diameter with a larger diameter main conductor or a tap conductor of larger diameter with a smaller diameter main conductor. The conductor interface insert may define recesses with different diameters of curvature.

The wedge 630 may include a recess along an elongated upper surface 634. The recess may be configured to receive the distribution connector. For example, the recess may cooperate with a bottom surface of the tap conductor. The wedge 630 may include a slide 636 that is configured to guide the wedge 630 into the body member 610. For example, the slide 636 may be received within the curved bottom wall 616 of the body member 610. The slide 636 may be configured substantially complementary to the cross-sectional shape of the curved bottom wall 616 such that the slide 636, in cooperation with the curved bottom wall 616, is configured to guide the wedge 630 as it moves into and out of the body member 610. The slide 636 may define an orifice that may be configured to receive the captive shear bolt assembly 650.

The wedge may define a tab 620. The tab 620 may extend (e.g., downwardly) from the wedge 630. The tab 620 may define an aperture passing therethrough. The tab 620 may be configured substantially complementary to the cross-sectional shape of the curved bottom wall 616 such that a rear wall of the tab 620 is configured to engage (e.g., align with) a front wall of the body member 610.

The captive shear bolt assembly 650 (e.g., such as the example captive shear bolt assembly 500 shown in FIGS. 5A-5C) may include a bolt 660, a shear coupling 670, and a fastener 680. The shear coupling 670 may define an upper head 675, a shear section 678, and a lower head 677. The bolt 660 may include a head 662, a shank 664, and an extension 663. The head 662 may be hexagonal. The extension 663 may extend from the head 662. The shank 664 may include a shoulder, a threaded portion 668, and a non-threaded portion 674. The shoulder may be between the head 662 and the threaded portion 668. The threaded portion 668 may be between the shoulder and the non-threaded portion 674. The non-threaded portion 674 may have a cross-sectional area that is less than or equal to a minor diameter of the threaded portion 668. The non-threaded portion 674 may define the distal end 676 of the shank 664. The non-threaded portion 674 may be configured to accept a fastener 680. The fastener 680 may define a head 682 and a threaded section 685. The head 682 may be a countersunk head, a round head, a pan head, a hex head, a washer hex head, a cap head, a button head, and/or the like. For example, the non-threaded portion 674 may define a cavity that includes internal threads 684. The internal threads 684 may be configured to receive the threaded section 685 of the fastener 680. The fastener 680 may be configured to retain the captive shear bolt assembly 650 within the tap connector 600. The fastener 680 may be a screw, a bolt, or some other type of anchoring fastener.

The captive shear bolt assembly 650 may be received by the aperture of the tab 620 and the orifice of the slide 636. For example, the shank 664 of the captive shear bolt assembly 650 may be received by the aperture and the orifice. A washer 672 may be received by the shank 664 such that when installed, the washer 672 is in contact with the head 662 and the wedge 630. The head 682 of the fastener 680 may be configured to prevent the captive shear bolt assembly 650 from being removed from the wedge 630. For example, the head 682 of the fastener 680 may be larger than the aperture through the slide 636 such that the captive shear bolt assembly 650 is retained within the wedge 630.

When the captive shear bolt assembly 650 is rotated in a clockwise direction, the captive shear bolt assembly 650 is threaded into the orifice of the slide 636 and the head 662 applies a force to the tab 620 such that the entire wedge 630 is moved within the body member 610. For example, the slide 636 is moved within the curved bottom wall 616 of the body member 610. When the wedge 630 is moved within the body member 610, the upper surface 634 of the wedge 630 moves upwardly toward the curved top wall 614. When the captive shear bolt assembly 650 is rotated in a counter clockwise direction, the wedge 630 may move away from the body member 610. When the wedge 630 is moved away from the body member 610, the upper surface 634 of the wedge 630 may move downwardly away from the curved top wall 614.

The tap connector 600 may be configured such that it is assembled without the conductor interface insert in place. The captive shear bolt assembly 650 may be in a position such that the wedge 630 is substantially withdrawn from the body member 610. The tap connector 600 may be suspended from a main conductor by resting the curved top wall 614 of the body member 610 around the main conductor. A tap conductor may be laid across the upper surface 634 of the wedge 630. The conductor interface insert may be positioned between the transmission and tap conductors, for example, outside of the body member 610. The conductor interface insert may be moved toward the interior of the body member 610, for example, using the conductors as a guide. The conductor interface insert may be moved until a leading surface of the conductor interface insert contacts the stop 618.

With the conductor interface insert in place, the captive shear bolt assembly 650 may be rotated such that the wedge 430 is moved toward interior of the body member 410. For example, the captive shear bolt assembly 650 may be rotatably driven by an applied external torque. The captive shear bolt assembly 650 may be rotated via the upper head 675. As the wedge 630 is moved into the interior of the body member 610, the recess 632 is moved into contact with the tap conductor which in turn is forced against a second recess on the lower surface of the conductor interface insert. A first recess on the upper surface of the conductor interface insert may be forced into contact the main conductor which in turn is forced into contact with the curved top wall 614 of the body member 610. The captive shear bolt assembly 650 may be configured to shear at a threshold torque. For example, the threshold torque may be determined such that it corresponds to the wedge 630 being in its proper position and sufficient pressure being placed on the conductors to provide a proper connection. The captive shear bolt assembly 650 may shear at the shear coupling 670. The extension 663 may be configured to retain the upper head 675 of the shear coupling 670 to the bolt 660 when the shear section 678 of the shear coupling 670 has sheared.

The invention claimed is:
1. A captive shear bolt assembly, comprising:
a bolt with a head that is hexagonal, a shank extending from a bottom surface of the head, and an extension extending from a top surface of the head, wherein the extension includes a first cavity extending therein; and
a shear coupling with an upper head, a lower head, and a shear section, wherein the shear coupling defines an orifice therethrough, and wherein the shear coupling is configured to receive the extension and the head of the bolt, wherein the shear section is configured to shear when the upper head is driven at a threshold torque, and wherein when the shear section has sheared, the upper head is mechanically decoupled from the bolt and the extension captively secures the upper head to the bolt.

2. The captive shear bolt assembly of claim 1, wherein an upper portion of the extension is configured to be deformed by inserting a tool within the first cavity, the deformed upper portion being configured to prevent removal of the shear coupling from the bolt.

3. The captive shear bolt assembly of claim 2, wherein the deformed upper portion of the extension is configured to engage an upper inner surface of the upper head such that the upper head is captively secured to the bolt.

4. The captive shear bolt assembly of claim 1, wherein the shank is partially threaded such that the shank comprises:
 a threaded portion;
 a shoulder between the threaded portion and the head; and
 a non-threaded portion between the threaded portion and a distal end of the shank,
 wherein the non-threaded portion defines a second cavity having internal threads configured to receive a fastener.

5. The captive shear bolt assembly of claim 4, wherein a diameter of the non-threaded portion is less than or equal to a minor diameter of the threaded portion.

6. The captive shear bolt assembly of claim 1, wherein the upper head is a hexagonal cap nut, and wherein the bolt is configured to rotate such that a threaded portion of the shank engages complimentary threads when the upper head is driven.

7. The captive shear bolt assembly of claim 1, wherein the shear section defines a tapered cross section with a first diameter at a lower surface of the upper head and a second diameter at an upper surface of the lower head, and a third diameter at a midpoint between the upper surface and the lower surface, and wherein the first diameter and the second diameter are greater than the third diameter, and wherein the third diameter is configured such that the shear section shears when the upper head is driven at the threshold torque.

* * * * *